July 5, 1966                K. V. BRAUN                3,258,811
                ANIMAL ELECTRICAL STUNNING APPARATUS
                    Original Filed May 6, 1963
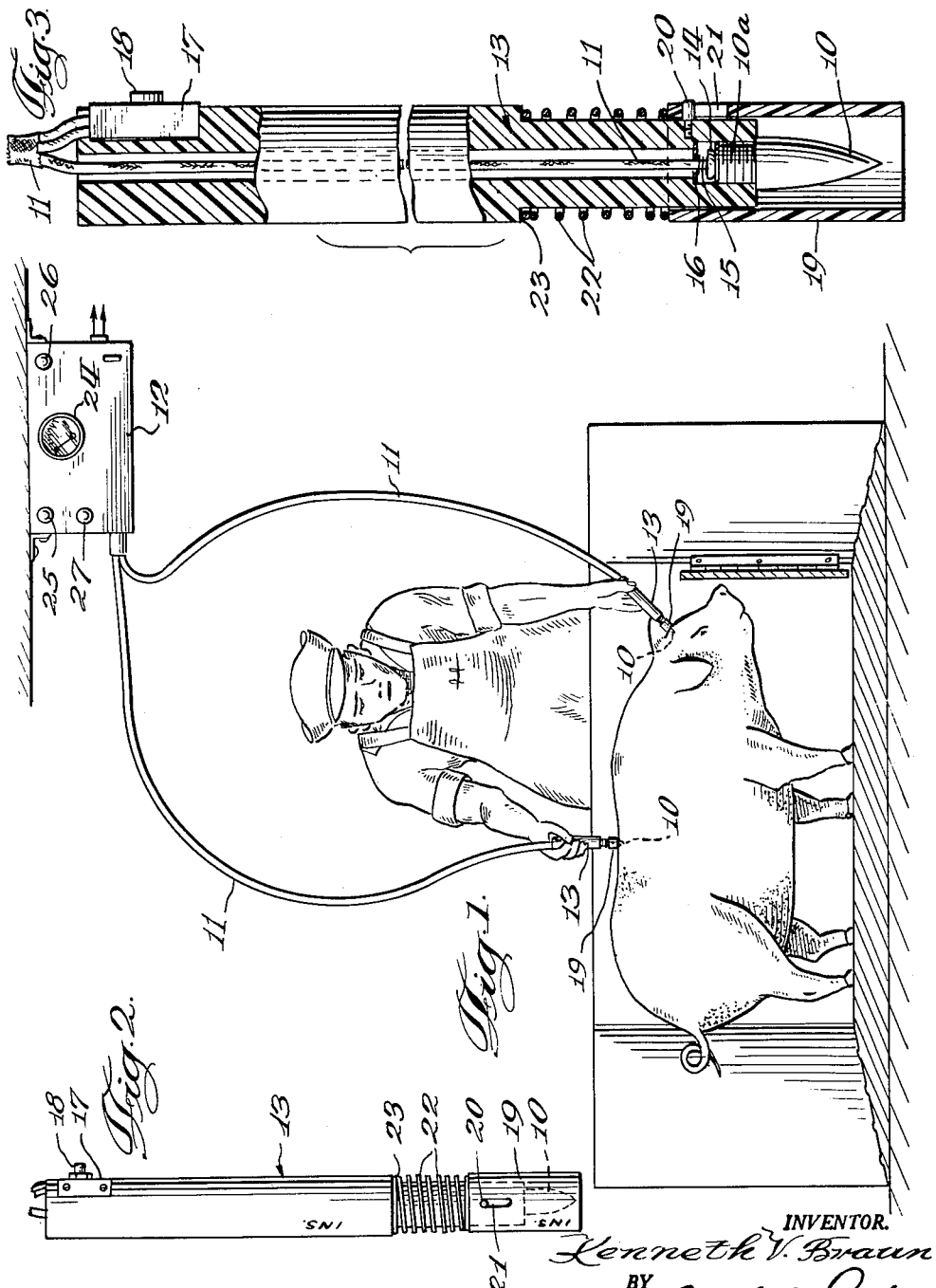
INVENTOR.
Kenneth V. Braun
BY Carl C. Batz
    Attorney

United States Patent Office 3,258,811
Patented July 5, 1966

3,258,811
ANIMAL ELECTRICAL STUNNING APPARATUS
Kenneth V. Braun, St. Paul Park, Minn., assignor to Armour and Company, Chicago, Ill., a corporation of Delaware
Original application May 6, 1963, Ser. No. 279,676. Divided and this application Aug. 20, 1964, Ser. No. 397,058
5 Claims. (Cl. 17—1)

This is a division of application Serial No. 279,676, filed May 6, 1963 which is a continuation-in-part of my pending application Serial No. 53,781 filed September 2, 1960, now abandoned.

This invention relates to animal electrical stunning apparatus, and more particularly to a humane and effective procedure by which meat animals, such as hogs, cattle, sheep, and other animals, are stunned and immobilized prior to slaughter.

In electrical stunning methods heretofore used, it has been found that the animal after being stunned has muscular spasms or convulsions which render subsequent slaughter operations difficult and hazardous. On the other hand, when the animal is completely electrocuted, the necessary heart action for pumping blood from the animal in the slaughter procedure is absent. Another difficulty is presented in making accurate application of the electrodes to the moving animal, and through the thick hairy coat, such as is found on the hog body and bodies of other animals. A further problem is presented in making such a device safe for use by the ordinary operator.

An object of the present invention is to provide a means for quickly immobilizing an animal so as to eliminate convulsions and muscular spasms, while keeping the animal alive and its heart in action during the ensuing slaughter procedure. A further object is to provide a means whereby a stunning electric current can be applied to the animal accurately, irrespective of its heavy coat of hair, for uniformly producing immobilizing without convulsions. A still further object is to provide multiple electrodes which are flexibly supported for ready and accurate placement and which will remain fixed in their relative positions during the stunning operation, while providing flexibility for use with animals of varying lengths and sizes. A further object is to provide applicator and control means which will assure the safety of the operator during the animal stunning operations. Other specific objects and advantages will appear as the specification proceeds.

The invention is shown in an illustrative embodiment by the accompanying drawing, in which:

FIG. 1 is a vertical view in elevation showing apparatus being applied to an animal in the practice of my invention with the animal pen being shown in cross-section; FIG. 2, an enlarged view in elevation of the electrode and handle support therefor; and FIG. 3, a further enlarged sectional view of the electrode and insulated handle support.

In the illustration given, 10 designates sharp pointed electrodes which are connected through flexible insulated electrical conductors 11 to a control cabinet or console 12. A handle support or prod 13 formed of insulating material receives a terminal portion of the conductor 11 leading to the electrode 10. In the specific illustration given, the terminal end portion 14 of the electrical conductor is urged in contact with the rear threaded portion 10a of the electrode by means of a spring 15. The spring 15 extends between the terminal head 14 of the flexible conductor 11 and a washer 16. The holder or handle 13 is recessed at its lower end and threaded to receive the threaded end 10a of the electrode 10 and also the terminal head 14, spring 15, and washer 16. Near its top, the handle support 13 is recessed to receive a switch member 17 provided with a button 18 adapted to be engaged by the thumb of the operator, as illustrated in FIG. 1. Each of the prod members carries a switch which is actuated by the plunger 18, and both switches have to be depressed before the electric circuit is completed and before the stunning voltage can be applied to the animal.

At the base of each prod, I provide an insulating sleeve 19 which is secured to the lower portion of the member 13 by a pin 20 extending through a vertical slot 21 in the sleeve. A spring 22 mounted between the sleeve 19 and the shoulder 23 of the prod member 13 normally urges the sleeve downwardly to the protective position illustrated best in FIGS. 2 and 3, the sleeve, however, yielding to permit engagement of the electrode with the animal when the prod 13 is pressed downwardly.

The control unit 12 is provided with an output voltage regulator 24, an output indicator 25, and an on-and-off indicator 26, the indicators preferably being in the form of lights. A short indicator 27 is also provided on the control unit.

Any suitable electrical circuits may be employed. From the standpoint of safety and for protecting the operator, I prefer to employ a low voltage circuit in which the switches 17 of each electrode are arranged in series. The low voltage circuit energizes through a relay a high voltage circuit in which the electrodes 10 are placed. Between the two circuits I employ a grounded core isolation transformer which provides protection against high voltage feeding back into the low voltage circuit during breakdown. I also employ a safety detector circuit which is energized by a short or incipient short and which opens the high voltage circuit immediately upon detecting a short to ground in the high voltage circuit and remains open until manually reset.

I also prefer to employ timer means which limits the duration of the current application so that the animal is not killed but yet is effectively stunned. For this purpose, a pulse time circuitry (preferably variable 1 to 3 seconds) is employed. The pulse time circuit may be a simple chopper-type and which will allow only one impulse output regardless of the length of time the probe push buttons 18 are depressed, the pulse length being determined by a network of well-known structure.

In the operation of the apparatus, the operator applies one electrode to the forehead of the animal, and the other electrode to the saddle of the animal, and a current under suitable voltage for stunning the animal is applied. It is found that the current flow from the forehead to the saddle of the animal brings about immediate immobilization, and kicking and other muscular spasms are eliminated. Further, the animal is not killed, and during the subsequent slaughter procedure the heart is effective in pumping the blood from the severed artery.

By having sharp metal points on the electrodes, it is found that the electrodes convey the current irrespective of the hairy coat of the animals, and further the electrodes remain in position when applied. It is important that the animals be moistened before they are stunned.

The spacing of the electrodes, the duration of the stunning current, the quantity of voltage and the current used are critical in producing the immediate immobilization without muscular spasms, while at the same time avoiding complete electrocution of the animal. For example, in the stunning of hogs, it is found that a spacing of 10 to 40 inches gives effective results when the voltage is 275 to 325 volts, and the current is 750 to 600 milliamperes respectively, and the time is 1–3 seconds. Excellent results were obtained with the probes spaced 16 inches between the forehead and the point of application on the spine of the hog with 300 volts, 675 milliamperes and a one and a half second time interval or duration of stunning current. In the stunning of small aimals, such as sheep and calves, different positionings or location of the probes, voltages, currents, and time interval are required. For example, in the stunning of calves and sheep, it is found that by putting one probe on the snout of the animal and the other probe in the rectum area effective results were obtained when the voltages were between 260–300 volts, a current of 30–10 milliamperes respectively, for three-quarters second time interval. Excellent results were obtained with one probe placed on the snout and the other probe placed in the rectum area of the animal using 280 volts and a current of 20 milliamperes for three-quarters of a second.

While in the foregoing specification, I have set forth in considerable detail one embodiment of the invention, it will be understood that such details of structure and procedure may be varied widely by those skilled in the art without departing from the spirit of my invention.

I claim:

1. An apparatus for stunning animals including a control means, said control means having separate flexible conductors extending therefrom, each of said conductors having a free end thereon, a sharp pointed electrode mounted on said free end, insulated handle means surrounding each electrode, means for passing an electric curent through said conductors and electrodes including a pair of switches wherein said switches must be closed to cause the flow of current.

2. The apparatus of claim 1 in which said electrodes are mounted in a high voltage circuit and said switches in a low voltage circuit, said low voltage circuit when closed energizes said high voltage circuit.

3. The structure of claim 1 in which one of said switches is mounted on one of said handles and the other switch on the other handle.

4. An apparatus for stunning animals including a console, flexible insulated conductors extending from said console, said flexible conductors having mounted at their ends a handle, switch means mounted on said handle, a spring urged movable sleeve forming a recess at the terminus of said handle, sharp pointed electrodes positioned within said recess, said conductors and said electrodes having a structure to accommodate placement on desired spaced portions of animals.

5. The structure of claim 4 in which said spring means normally urges said sleeve outwardly about said electrodes and permit retraction of said sleeve as contact is made with the animal.

References Cited by the Examiner

UNITED STATES PATENTS 3,152,357 10/1964 Wemmer _____ 17—1

FOREIGN PATENTS 567,355 12/1932 Germany.
585,908 10/1933 Germany.

SAMUEL KOREN, *Primary Examiner.*

LUCIE H. LAUDENSLAGER, *Examiner.*